(12) United States Patent
Min et al.

(10) Patent No.: US 11,518,217 B2
(45) Date of Patent: Dec. 6, 2022

(54) AIR CONDITIONER FOR VEHICLE AND METHOD FOR CONTROLLING THE SAME

(71) Applicant: HANON SYSTEMS, Daejeon (KR)

(72) Inventors: Se Won Min, Daejeon (KR); Sang Jun Yoo, Daejeon (KR); Young Min Kim, Daejeon (KR); Chui Soon Kim, Daejeon (KR); Hong Rae Jung, Daejeon (KR); Chang Hyun Baek, Daejeon (KR); Dae Yeop Jeong, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 769 days.

(21) Appl. No.: 16/020,209

(22) Filed: Jun. 27, 2018

(65) Prior Publication Data

US 2019/0001788 A1  Jan. 3, 2019

(30) Foreign Application Priority Data

Jun. 29, 2017 (KR) .................. 10-2017-0082434
Jun. 26, 2018 (KR) .................. 10-2018-0073079

(51) Int. Cl.
  *B60H 1/22* (2006.01)
  *B60H 1/00* (2006.01)

(52) U.S. Cl.
  CPC ......... *B60H 1/2218* (2013.01); *B60H 1/2225* (2013.01); *B60H 2001/00128* (2013.01);
  (Continued)

(58) Field of Classification Search
  CPC ................ B60H 1/2218; B60H 1/2225; B60H 2001/224
  (Continued)

(56) References Cited

U.S. PATENT DOCUMENTS

| 5,390,728 A | * | 2/1995 | Ban | ................. B60H 1/00842 165/204 |
| 9,188,357 B2 | * | 11/2015 | Hirai | ................. B60H 1/00842 |
| 2012/0166041 A1 | * | 6/2012 | Takehisa | ............ B60H 1/00742 701/36 |

FOREIGN PATENT DOCUMENTS

| CN | 102954561 A | 3/2013 |
| JP | H11198636 A | 7/1999 |

(Continued)

OTHER PUBLICATIONS

Translation of KR20120032303; Translated on Apr. 9, 2021 (Year: 2021).*

*Primary Examiner* — Tu B Hoang
*Assistant Examiner* — Thomas J Ward
(74) *Attorney, Agent, or Firm* — Dickinson Wright PLLC

(57) ABSTRACT

An air conditioner for a vehicle includes an air conditioning case having a first air passageway and a second air passageway partitioned by a separator therein; a PTC heater disposed in each of the first air passageway and the second air passageway to generate heat by electric energy; and a control unit for controlling operation of the PTC heater. The control unit individually controls discharge temperature of the first air passageway and discharge temperature of the second air passageway of the PTC heater, and if target discharge temperature of the first air passageway and target discharge temperature of the second air passageway are different from each other, the control unit calculates and outputs a compensation value for the PTC heater output of at least one of the first air passageway and the second air passageway. The PTC heater therefore has a reduced output when controlling for dual temperatures.

14 Claims, 4 Drawing Sheets

(52) U.S. Cl.
CPC ............... *B60H 2001/224* (2013.01); *B60H 2001/2265* (2013.01); *B60H 2001/2296* (2013.01); *H05B 2203/02* (2013.01)

(58) Field of Classification Search
USPC ....... 219/202, 385, 409, 411, 483, 490, 509, 219/511, 552, 553
See application file for complete search history.

(56) References Cited

FOREIGN PATENT DOCUMENTS

| KR | 20120032303 | * | 4/2012 | ........... B60H 1/0236 |
| KR | 20120046542 | A | 5/2012 | |
| KR | 20120120655 | * | 11/2012 | ........... B60H 1/0236 |
| WO | 2016171478 | A1 | 10/2016 | |

* cited by examiner

AIR CONDITIONER FOR VEHICLE AND METHOD FOR CONTROLLING THE SAME

CROSS REFERENCE TO RELATED APPLICATION

This U.S. utility patent application claims the benefit and priority of Korean patent application Nos. KR 10-2017-0082434, filed Jun. 29, 2017, and KR 10-2018-0073079, filed Jun. 26, 2018, the contents of each are incorporated herein by reference in their entirety.

BACKGROUND OF THE INVENTION

Field of the Invention

The present invention relates to an air conditioner for a vehicle and a method for controlling the same, and, more particularly, to an air conditioner for a vehicle, which includes a PTC heater generating heat using electric power to perform air-conditioning of the interior of the vehicle, and a method for controlling the same.

Background Art

In general, an air conditioner for a vehicle with an internal combustion engine includes an evaporator for cooling and a heater core for heating, which are mounted inside an air conditioning case, in order to selectively blow air cooled by the evaporator or heated by the heater core toward the interior of the vehicle using a door.

In order to enhance heating performance, a positive temperature coefficient heater (PTC heater), which is an electric heater, is used as a heating source or an auxiliary heating source.

Korean Patent Publication No. 10-2012-0046542 published on May 10, 2012 discloses an air conditioner for a vehicle, which can control temperature of the air conditioner for an electric vehicle from top to bottom and from side to side.

A conventional air conditioner for a vehicle includes a separator which divides the inside of an air conditioning case into a left passageway and a right passageway, a left heater mounted in the left passageway of the air conditioning case and a right heater mounted in the right passageway. Therefore, conventional air conditioners can effectively control temperature of a PTC heater from top to bottom and from side to side.

However, in case that there is a great difference in temperature between the PTC heater of the driver's side and the PTC heater of the passenger's side during control of a high-voltage dual PTC heater, the conventional air conditioner for the vehicle has a disadvantage in that heat of the PTC heater of a higher temperature side is transferred toward the PTC heater of a lower temperature side by conduction such that temperature of the PTC heater of the lower temperature side increases inadvertently slightly.

SUMMARY OF THE INVENTION

Accordingly, the present invention has been made to solve the above-mentioned problems occurring in the prior arts, and it is an object of the present invention to provide an air conditioner for a vehicle and a method for controlling the same, which can lower output of a PTC heater of a lower target temperature side using conduction heat during control of a dual PTC heater.

To accomplish the above object, according to the present invention, there is provided an air conditioner for a vehicle including: an air conditioning case having a first air passageway and a second air passageway partitioned by a separator therein; a PTC heater disposed in the first air passageway and the second air passageway to generate heat by electric energy; and a control unit for controlling operation of the PTC heater, wherein the control unit individually controls a discharge temperature of the first air passageway and a discharge temperature of the second air passageway by individually controlling a PTC heater output for each of the air passageways, and if target discharge temperature of the first air passageway and target discharge temperature of the second air passageway are different from each other, the control unit calculates and outputs a compensation value for PTC heater output of at least one of the first air passageway and the second air passageway.

In another aspect of the present invention, the present invention provides a method for controlling an air conditioner for a vehicle comprising the steps of: comparing a target discharge temperature of a first air passageway with a target discharge temperature of a second air passageway; and calculating and outputting a compensation value for the PTC heater output with the lower target discharge temperature if the target discharge temperature of the first air passageway and the target discharge temperature of the second air passageway are different from each other.

According to the present invention, the air conditioner for the vehicle and the method for controlling the same can lower PTC output of a lower target temperature zone using conduction heat, thereby reducing power consumption and increasing fuel efficiency.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, technical structure of an air conditioner for a vehicle according to exemplary embodiments of the present invention will be described with reference to the accompanying drawings.

Figure 1:
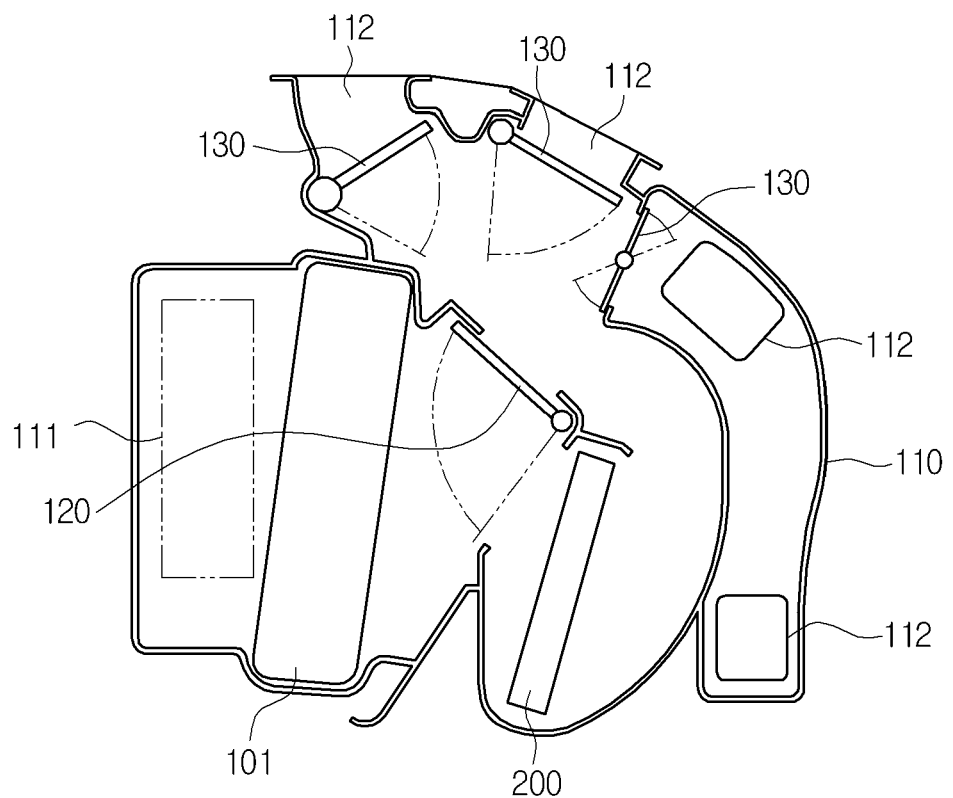
FIG. 1 is a sectional view of an air conditioner for a vehicle according to a preferred embodiment of the present invention.
Figure 2:
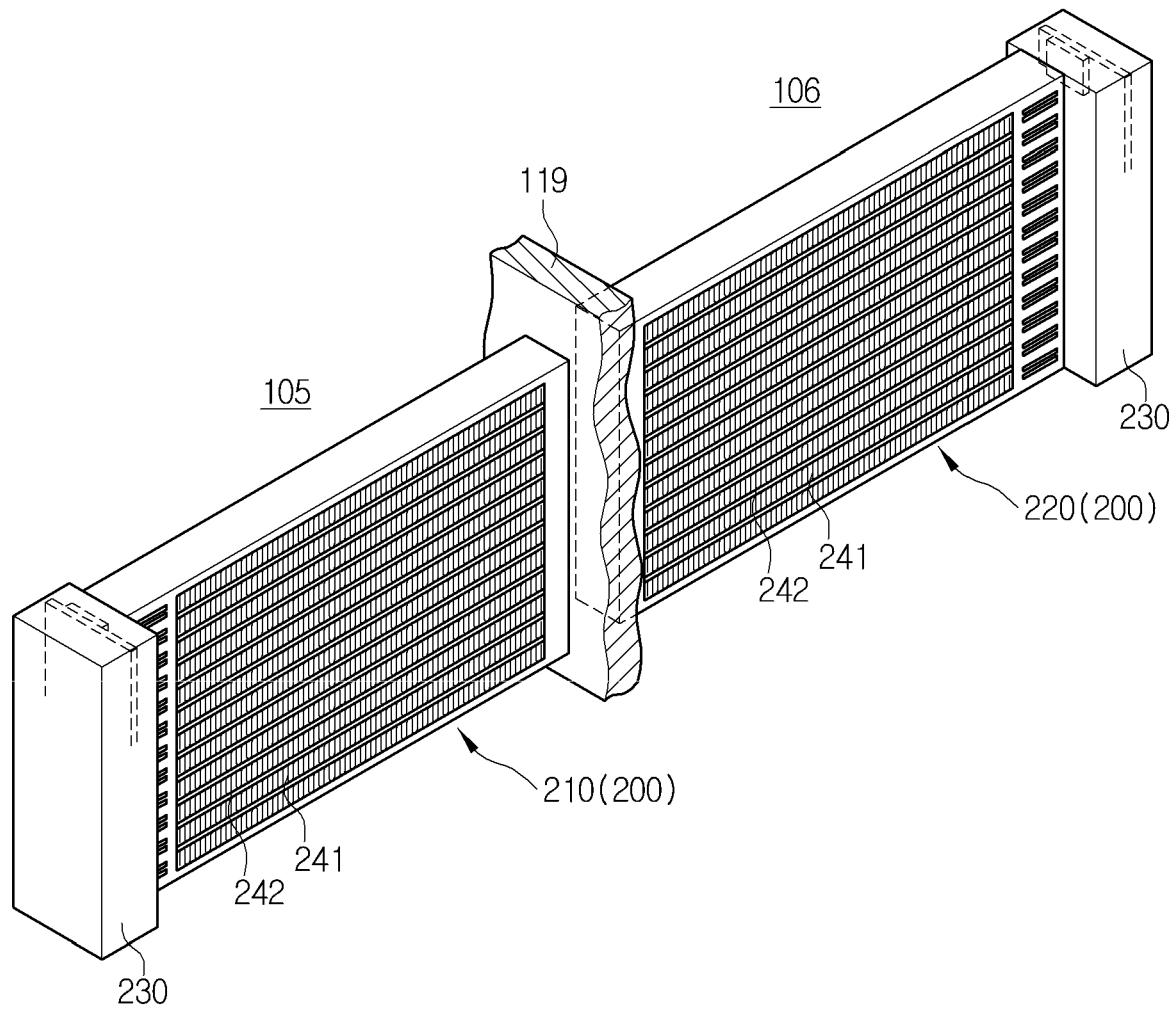
FIG. 2 is a perspective view showing a PTC heater of the air conditioner for the vehicle.
Figure 3:
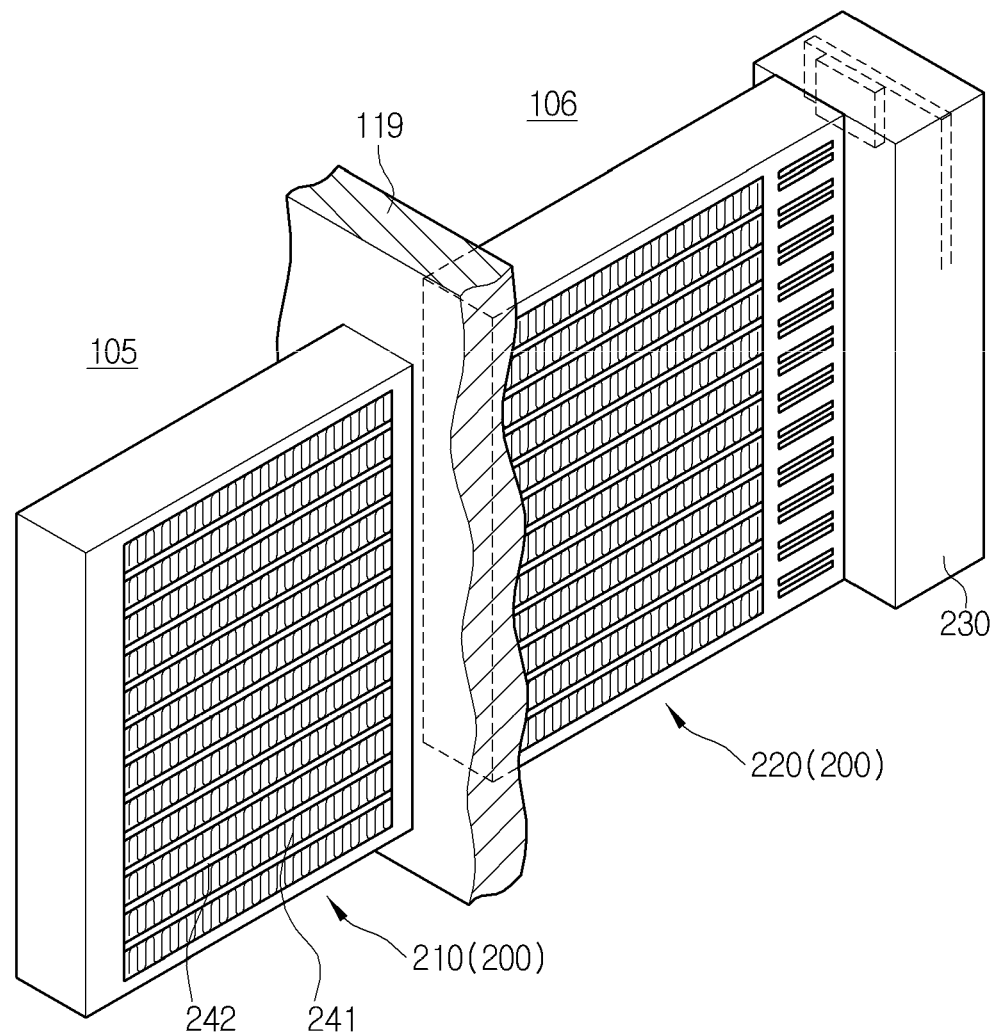
FIG. 3 is a perspective view showing a PTC heater of an air conditioner for a vehicle according to a modification of FIG. 2.
Figure 4:
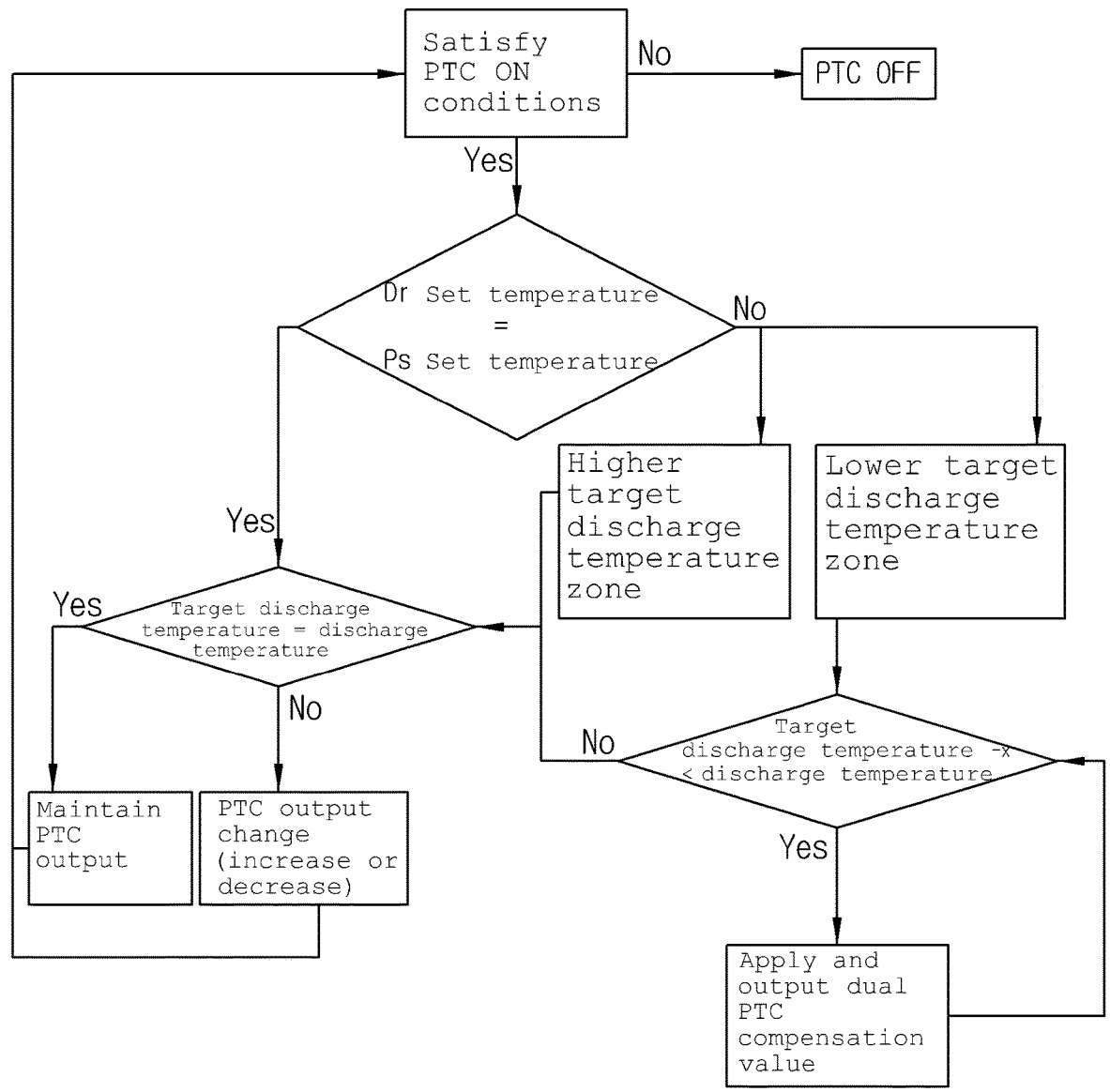
FIG. 4 is a flow chart showing a method for controlling the air conditioner for the vehicle according to the preferred embodiment of the present invention.

FIG. 1 is a sectional view of an air conditioner for a vehicle according to a preferred embodiment of the present invention, FIG. 2 is a perspective view showing a PTC heater of the air conditioner for the vehicle, FIG. 3 is a perspective view showing a PTC heater of an air conditioner for a vehicle according to a modification of FIG. 2, and FIG. 4 is a flow chart showing a method for controlling the air conditioner for the vehicle according to the preferred embodiment of the present invention.

Referring to FIGS. 1 to 4, the air conditioner for the vehicle according to the preferred embodiment of the present invention includes: an air conditioning case 110 having an air inflow port 111 formed at an inlet thereof and a plurality of air outflow ports 112 formed at an outlet thereof; an evaporator 101 and a PTC heater 200 mounted inside the air conditioning case 110; a temp door 120 mounted between the evaporator 101 and the PTC heater 200 to control temperature; and mode doors 130 respectively mounted at the air outflow ports 112 to regulate the degree of opening of the air outflow ports 112 according to air conditioning modes. Moreover, a separator 119 is disposed inside the air conditioning case 110 to divide an air path into two air passageways.

In case of an internal combustion engine vehicle, the air conditioner may include a heater core using cooling water heated by an engine as a heat source and a PTC heater 200 which will be used as an auxiliary heat source. Furthermore, in case of an electric vehicle, the air conditioner may use the PTC heater 200 as a main heat source.

The air conditioning case 110 includes an air path formed therein, and the air path is formed between the air inflow port 111 and the air outflow ports 112. The air path is partitioned by the separator 119 into a first air passageway 105 and a second air passageway 106. The first air passageway 105 and the second air passageway 106 respectively mean a left passageway and a right passageway, the first air passageway 105, namely, the left passageway is a path for discharging air toward the driver's seat, and the second air passageway 106, namely, the right passageway is a path for discharging air toward the passenger's seat.

The PTC heater 200 is a high voltage PTC, is disposed at the first air passageway 105 and the second air passageway 106, and generates heat by electric energy. The PTC heater 200 is a single unit, extending through the first air passageway 105 and the second air passageway 106 after passing through the separator 119.

The PTC heater 200 includes a housing inserted to be over the first air passageway 105 and the second air passageway 106, and a core unit having cores respectively arranged in the passageways inside the housing. The PTC heater 200 includes a first PTC heater unit 210 arranged on the first air passageway 105, and a second PTC heater unit 220 arranged on the second air passageway 106. The first PTC heater unit 210 and the second PTC heater unit 220 are formed integrally and are located at right and left sides based on the separator 119. The first PTC heater unit 210 has a first core unit and the second PTC heater unit 220 has a second core unit.

The PTC heater 200 has a control unit 230. The control unit 230 controls operation of the PTC heater 200. As shown in FIG. 2, two control units 230 may be respectively disposed on the first PTC heater unit 210 and the second PTC heater unit 220, or as shown in FIG. 3, one control unit 230 may be disposed on one of the first PTC heater unit 210 and the second PTC heater unit 220. The control unit 230 individually control voltage supplied to the first PTC heater unit 210 and the second PTC heater unit 220.

Moreover, the PTC heater 200 includes a heating rod 242 having a PTC element and a "+" terminal therein and another heating rod 242 having a PTC element and a "−" terminal therein, which are arranged to be spaced apart from each other at a predetermined interval, and a radiation fin 241 disposed between the heating rods 242. The control unit 230 includes a voltage control element for controlling voltage supplied to the "+" terminal and the "−" terminal of the heating rods 242.

When a duty ratio of a pulse width modulation (PWM) signal corresponding to a set temperature of the interior of the vehicle is controlled, the voltage supplied to the PTC heater 200 may be controlled variably. The voltage control element of the control unit 230 of the PTC heater 200 varies voltage supplied to the terminal of the heating rod 242 depending on the duty ratio of the PWM signal, and in this instance, the temperature of the PTC element attached to the terminal is varied to heat the air passing through the radiation fin 241.

As described above, the control unit 230 individually controls an actual discharge temperature of the first air passageway and an actual discharge temperature of the second air passageway of the PTC heater 200.

Furthermore, if a target discharge temperature of the first air passageway is different from a target discharge temperature of the second air passageway, the control unit 230 calculates and outputs a compensation value for PTC heater output of at least one of the first air passageway and the second air passageway.

When the dual PTC heater 200 of high voltage is operated individually, heat of a higher target temperature zone is transmitted to a lower target temperature zone. That is, when the target discharge temperature of the first air passageway 105 is higher than the target discharge temperature of the second air passageway 106, heat of the first PTC heater unit 210 is transmitted to the second PTC heater unit 220. As a result, the lower target temperature zone, namely, the second air passageway 106 in which the second PTC heater unit 220 is located, generates an actual discharge temperature that is higher than the intended discharge temperature.

Finally, the compensation value for PTC heater output of at least one of the first air passageway and the second air passageway is calculated and outputted, so that the problem of the actual discharge temperature being higher than the intended temperature due to transmission of heat can be solved by offsetting by the compensation value.

Preferably, the control unit 230 calculates and outputs a compensation value for PTC heater output associated with the air passageway 105, 106 having a lower target discharge temperature, which may also be called the lower target temperature zone. In more detail, the control unit 230 controls to reduce PTC heater output of the lower target temperature zone. The control unit 230 can also compensate for a PTC heater output the air passageway having a higher target discharge temperature, which may also be called the higher target temperature zone. However, it is disadvantageous to increase the PTC heater output of the higher target temperature zone because of a corresponding reduction in fuel efficiency.

Finally, the control unit 230 controls to reduce PTC heater output of the lower target temperature zone so as to reduce power consumption and increase fuel efficiency.

Additionally, the compensation value may be set to be proportional to the absolute value of a difference between a target discharge temperature of the first air passageway and a target discharge temperature of the second air passageway. In this instance, the compensation value is applicable as shown in the following Table 1.

TABLE 1

| abs(target discharge temperature of driver's side-target discharge temperature of passenger's side)(° C.) | Dual PTC heater compensation value |
| --- | --- |
| 0.5 | 0.0 |
| 2.0 | −2.0 |
| 4.0 | −4.0 |
| 6.0 | −6.0 |
| 8.0 | −8.0 |

A method for controlling the air conditioner for the vehicle according to an embodiment of the present invention includes the steps of: comparing a target discharge temperature of the first air passageway with a target discharge temperature of the second air passageway; and calculating and outputting a compensation value for the PTC heater output with a lower target discharge temperature (the lower target temperature zone), if the target discharge temperature of the first air passageway 105 and the target discharge temperature of the second air passageway 106 are different from each other.

Moreover, in cases where the target discharge temperature of the first air passageway and the target discharge temperature of the second air passageway are different from each other, the method for controlling the air conditioner for the vehicle according to an embodiment of the present invention further includes the step of comparing the actual discharge temperature of the lower target temperature zone with the target discharge temperature of the lower target temperature zone minus the compensation value. If the target discharge temperature minus the compensation value is less than the actual discharge temperature, the compensation value is applied to carry out PTC heater output.

Furthermore, where the target discharge temperature of the first air passageway and the target discharge temperature of the second air passageway are equal to each other, the method for controlling the air conditioner for the vehicle according to an embodiment of the present invention further includes the step of comparing the actual discharge temperature with the target discharge temperature. If the target discharge temperature and the actual discharge temperature are equal, the PTC heater output is maintained, but if the target discharge temperature and the actual discharge temperature are different from each other, the PTC heater output is increased or decreased.

In case that the target discharge temperature of the first air passageway and the target discharge temperature of the second air passageway are different from each other, the method for controlling the air conditioner for the vehicle according to an embodiment of the present invention further includes the step of comparing the actual discharge temperature of the higher target temperature zone with the target discharge temperature of the higher target temperature zone.

As shown in FIG. 4, when conditions for turning on the PTC heater 200 are satisfied, the target discharge temperature of the first air passageway and the target discharge temperature of the second air passageway are compared with each other. If the conditions for turning on the PTC heater 200 are not satisfied, the PTC heater 200 is turned off.

If the target discharge temperature of the first air passageway 105 and the target discharge temperature of the second air passageway 106 are equal, the target discharge temperature and the actual discharge temperature are compared with each other. If the target discharge temperature and the actual discharge temperature are equal, the PTC heater output is maintained, but if the target discharge temperature and the actual discharge temperature are different from each other, the PTC heater output is increased or decreased. After that, the control unit 230 judges whether conditions for turning on the PTC heater 200 are satisfied or not, and repeats the above steps.

If the target discharge temperature of the first air passageway 105 and the target discharge temperature of the second air passageway 106 are different from each other, the step of comparing the target discharge temperature with the actual discharge temperature in the higher target temperature zone is carried out to carry out the existing control. In addition, the actual discharge temperature of the lower target temperature zone is compared against the target discharge temperature of the lower target temperature zone minus the compensation value.

If the target discharge temperature minus the compensation value (x) is less than the actual discharge temperature, the compensation value is applied to carry out PTC heater output. If the target discharge temperature minus the compensation value (x) is not less than the actual discharge temperature, the step of comparing the target discharge temperature with the actual discharge temperature is carried out to carry out the existing control.

With reference to the flow chart of FIG. 4, a method for controlling a PTC heater 200 within an air conditioner for a vehicle is provided. The method comprises the steps of: comparing a target discharge temperature of a first air passageway 105 with a target discharge temperature of a second air passageway 106; and calculating and outputting a compensation value based upon a difference between the target discharge temperature of the first air passageway 105 and the target discharge temperature of the second air passageway 106. The method also includes adjusting the target discharge temperature of one of the first air passageway 105 or the second air passageway 106 by the compensation value as an adjusted target temperature. The method concludes with the step of controlling the PTC heater 200 to heat air passing through one of the first air passageway 105 and the second air passageway 106 to the adjusted target temperature.

According to an aspect, the step of adjusting the target discharge temperature of one of the first air passageway 105 or the second air passageway 106 by the compensation value may include subtracting the compensation value from the target discharge temperature of the one of the first air passageway 105 or the second air passageway 106.

According to another aspect, the method may also include determining a lower target temperature zone as one of the air passageways 105, 106 having a target discharge temperature lower than the target discharge temperature of the other one of the air passageways 105, 106; and adjusting the target temperature of only the lower target temperature zone.

According to another aspect, the step of controlling the PTC heater 200 to heat air passing through one of the first air passageway 105 and the second air passageway 106 to the adjusted target temperature is only performed with an actual discharge temperature of the one of the first air passageway 105 and the second air passageway 106 being greater than the adjusted target temperature. The method may therefore also include controlling the PTC heater 200 to heat air passing through the one of the first air passageway 105 and the second air passageway 106 to the an associated discharge target temperature with the actual discharge temperature of the one of the first air passageway and the second air passageway being less than or equal to the adjusted target temperature.

A lookup table, similar to what is shown in Table 1, above, may be used to determine the compensation value based upon the target discharge temperatures. Alternatively, a control unit 230 may directly calculate the compensation value based upon the target discharge temperatures using a mathematical formula. For example, the compensation value may be equal to the absolute value of the difference between the target discharge temperatures. Furthermore, any fractional value in the difference between the target discharge temperatures may be rounded or chopped. An example of a chopped fractional value is shown in the top row of Table 1, where a difference of 0.5 results in a compensation value of 0.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

What is claimed is:

1. A method for controlling an air conditioner for a vehicle including a PTC heater comprising the steps of:
   comparing a target discharge temperature of a first air passageway with a target discharge temperature of a second air passageway with a control unit;
   reducing a PTC heater output associated with one of the first and second air passageways with a lower target discharge temperature by an amount associated with a compensation value in order to prevent an actual discharge temperature from one of the air passageways from becoming higher than the target discharge temperature of the one of the air passageways as heat from one of the air passageways with a higher target discharge temperature is conducted to an air passageway with a lower target discharge temperature if the target discharge temperature of the first air passageway and the target discharge temperature of the second air passageway are different from one another, wherein the compensation value is set to be proportional to an absolute value of a difference between the target discharge temperature of the first air passageway and the target discharge temperature of the second air passageway;
   establishing one of the first and second air passageways having a target discharge temperature that is lower than the target discharge temperature of the other of the first and second air passageways as a lower temperature zone, and comparing an actual discharge temperature of the lower target temperature zone with a target discharge temperature of the lower target temperature zone minus the compensation value, if the target discharge temperature of the first air passageway and the target discharge temperature of the second air passageway are different from each other; and
   reducing the PTC heater output associated with the lower temperature zone by an amount associated with the compensation value if the target discharge temperature of the lower target temperature zone minus the compensation value is less than the actual discharge temperature of the lower target temperature zone.

2. The method according to claim 1, further comprising the steps of:
   comparing the target discharge temperature of one of the first and second air passageways with the actual discharge temperature of the one of the first and second air passageways, if the target discharge temperature of the first air passageway and the target discharge temperature of the second air passageway are equal; and
   maintaining the PTC heater output if the target discharge temperature of the one of the first and second air passageways and the actual discharge temperature of the one of the first and second air passageways are equal, and increasing or decreasing the PTC heater output if the target discharge temperature of the one of the first and second passageways and the actual discharge temperature of the one of the first and second passageways are different from each other.

3. The method according to claim 1, further comprising the step of:
   establishing one of the first and second air passageways having a target discharge temperature that is higher than the target discharge temperature of the first and second air passageways as a higher target temperature zone;
   comparing the target discharge temperature and the actual discharge temperature in the higher target temperature zone if the target discharge temperature of the first air passageway and the target discharge temperature of the second air passageway are different from each other.

4. A method for controlling a PTC heater within an air conditioner for a vehicle comprising the steps of:
   comparing a target discharge temperature of a first air passageway with a target discharge temperature of a second air passageway;
   calculating and outputting a compensation value set to be proportional to an absolute value of a difference between the target discharge temperature of the first air passageway and the target discharge temperature of the second air passageway in order to prevent an actual discharge temperature from one of the air passageways from becoming higher than the target discharge temperature of the one of the air passageways as heat from one of the air passageways with a higher target discharge temperature is conducted to an air passageway with a lower target discharge temperature;
   adjusting the target discharge temperature of one of the first air passageway or the second air passageway by the compensation value as an adjusted target temperature; and
   controlling the PTC heater to heat air passing through one of the first air passageway and the second air passageway to the adjusted target temperature.

5. The method according to claim 4, wherein the step of adjusting the target discharge temperature of one of the first air passageway or the second air passageway by the compensation value includes subtracting the compensation value from the target discharge temperature of the one of the first air passageway or the second air passageway.

6. The method according to claim 4, further including:
   determining a lower target temperature zone as one of the air passageways having a target discharge temperature lower than the target discharge temperature of the other one of the air passageways; and
   and wherein the one of the first air passageway and the second air passageway controlled to the adjusted target temperature is the lower target temperature zone.

7. The method according to claim 4, wherein the step of controlling the PTC heater to heat air passing through one of the first air passageway and the second air passageway to the adjusted target temperature is only performed with an actual discharge temperature of the one of the first air passageway and the second air passageway being greater than the adjusted target temperature.

8. The method according to claim 7, further including:
controlling the PTC heater to heat air passing through the one of the first air passageway and the second air passageway to the an associated discharge target temperature with the actual discharge temperature of the one of the first air passageway and the second air passageway being less than or equal to the adjusted target temperature.

9. The method according to claim 4, wherein the step of calculating and outputting a compensation value based upon a difference between the target discharge temperature of the first air passageway and the target discharge temperature of the second air passageway further includes using a lookup table to determine the compensation value.

10. The method according to claim 4, wherein the step of calculating and outputting a compensation value based upon a difference between the target discharge temperature of the first air passageway and the target discharge temperature of the second air passageway further includes calculating the compensation value by a control unit using a mathematical formula.

11. The method according to claim 1, wherein reducing the PTC heater output includes varying a voltage supplied to the PTC heater.

12. The method according to claim 1, wherein the PTC heater includes a first PTC heater unit in the first air passageway and a second PTC heater unit in the second air passageway, and wherein reducing a PTC heater output associated with one of the first and second air passageways includes reducing an output of the PTC heat unit one of the first and second air passageways.

13. The method according to claim 4, wherein controlling the PTC heater includes varying a voltage supplied to the PTC heater.

14. The method according to claim 4, wherein the PTC heater includes a first PTC heater unit in the first air passageway and a second PTC heater unit in the second air passageway, and wherein controlling the PTC heater includes reducing an output of the PTC heat unit one of the first and second air passageways.

* * * * *